Patented June 23, 1936

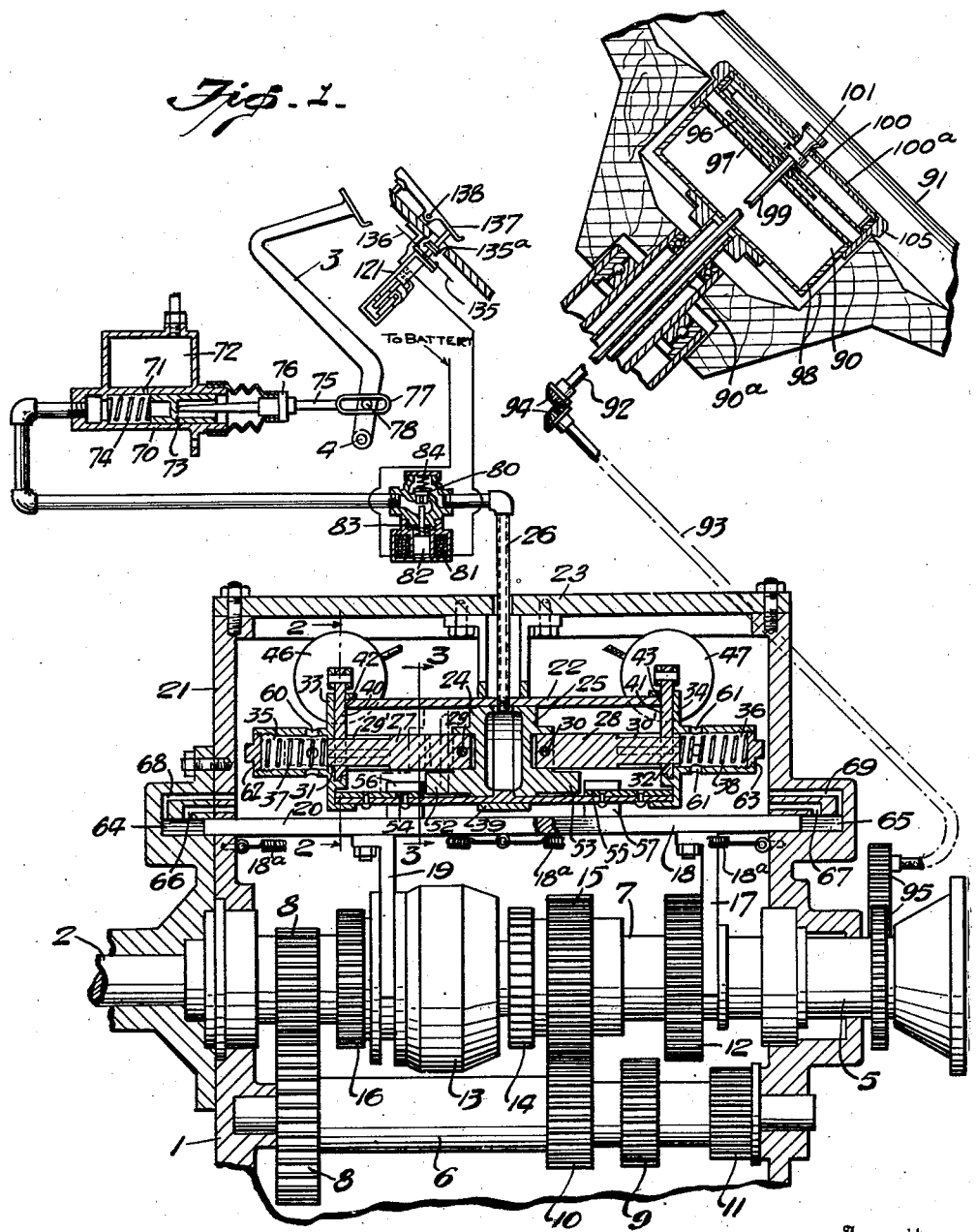

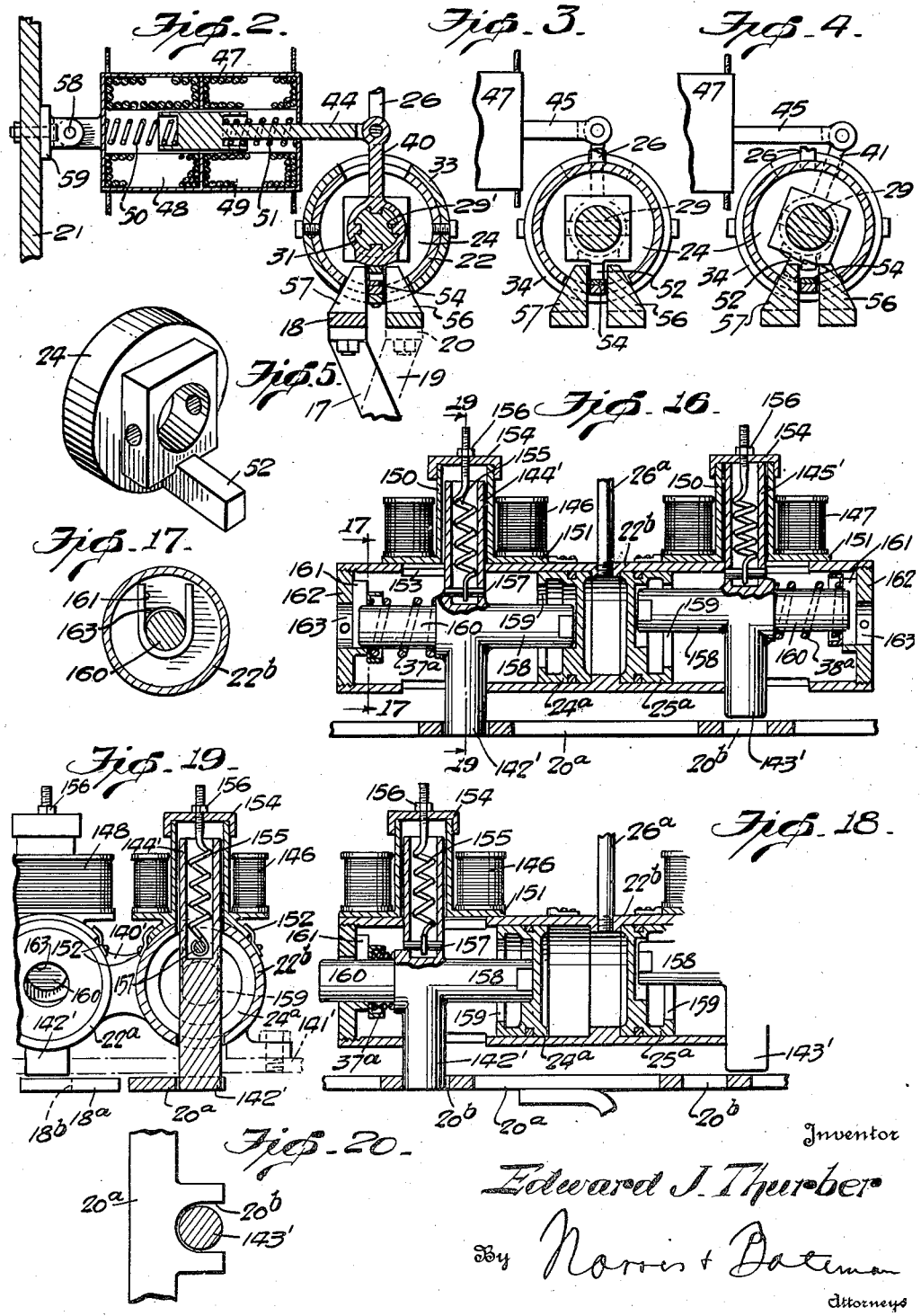

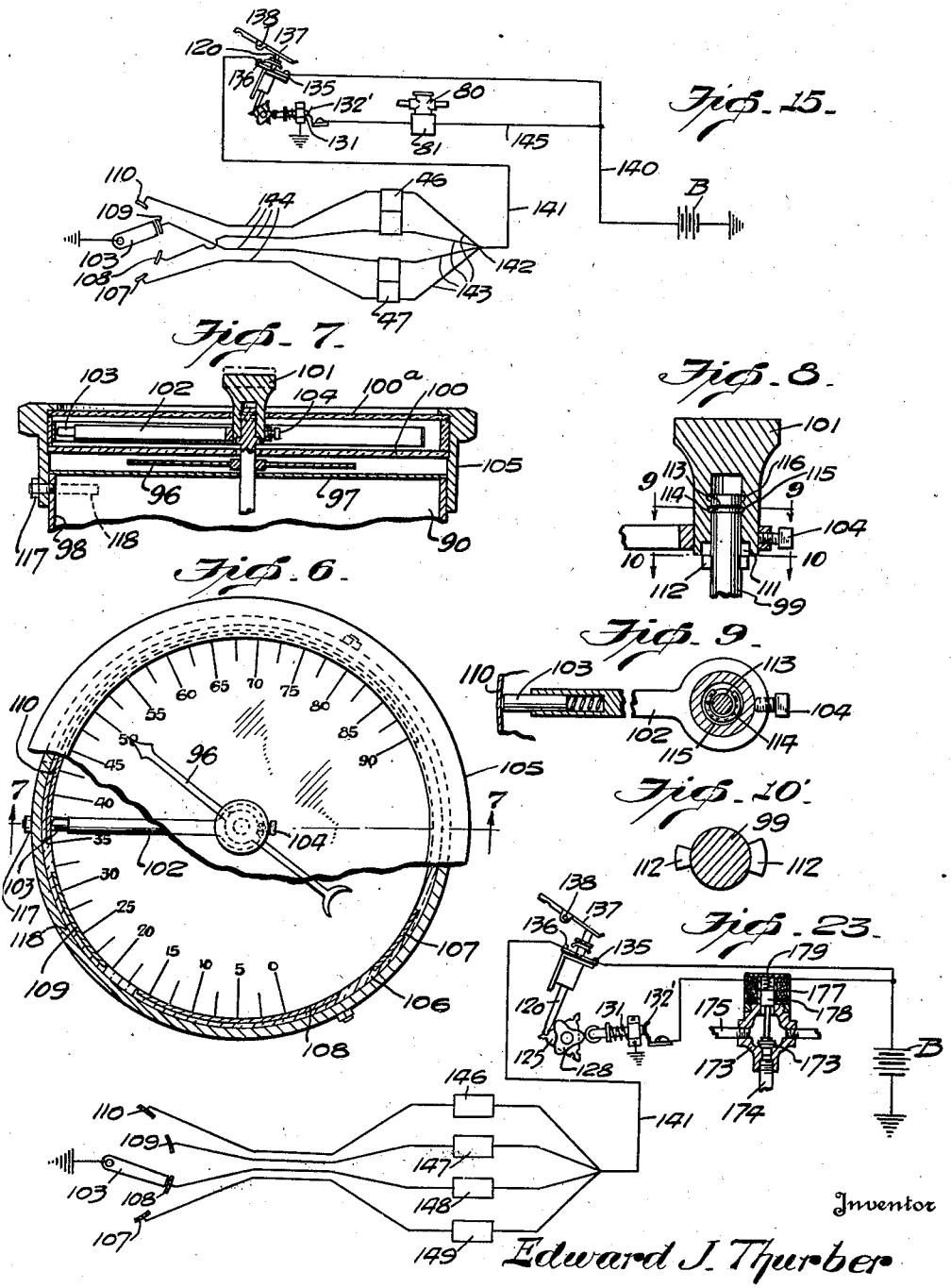

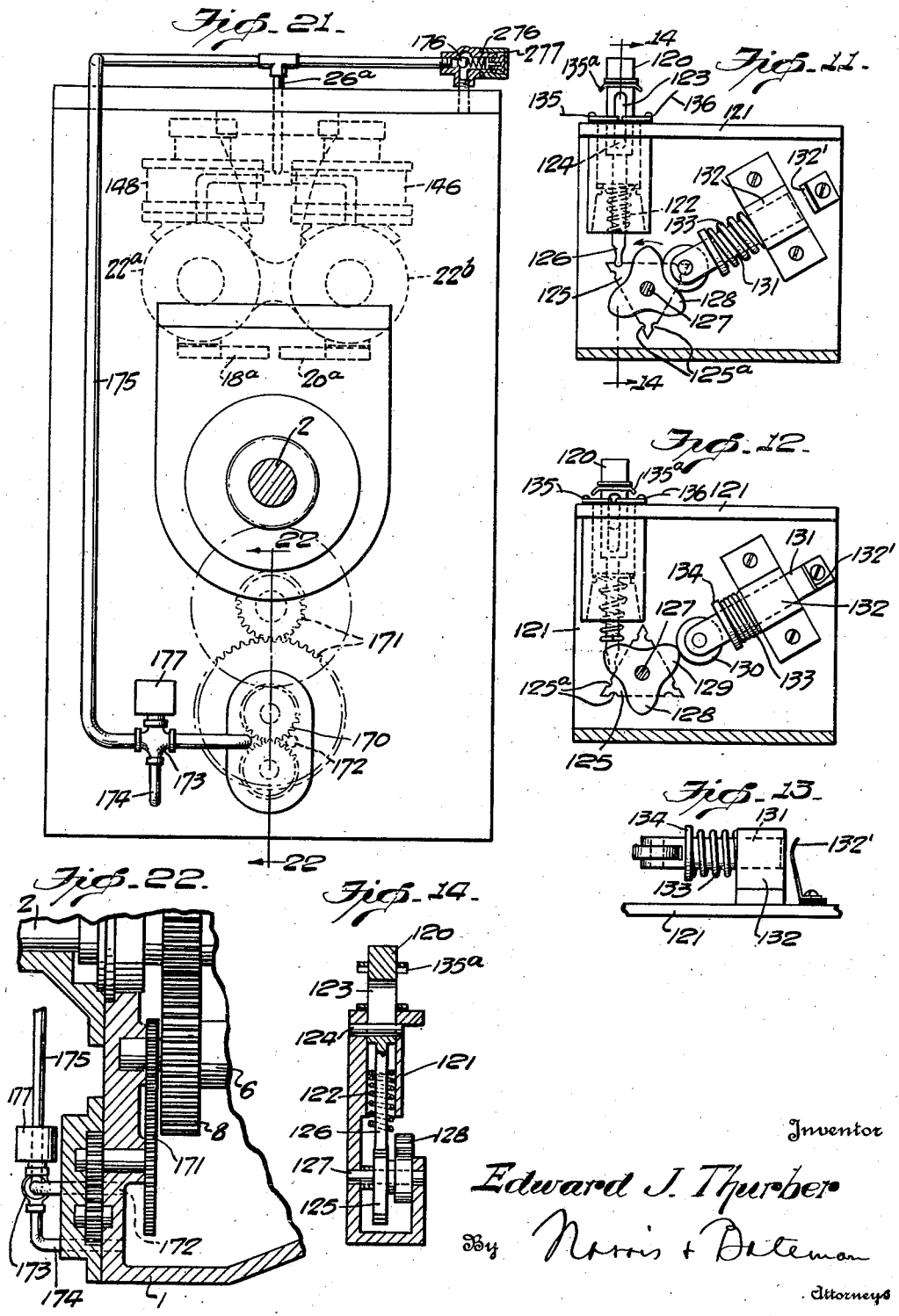

2,045,500

UNITED STATES PATENT OFFICE 2,045,500

AUTOMATIC GEAR SHIFTING DEVICE

Edward John Thurber, New Orleans, La., assignor of one-half to Ralph K. Rothrock, New Orleans, La.

Application September 1, 1934, Serial No. 742,453

33 Claims. (Cl. 74—334)

The present invention relates to improvements in means for automatically shifting the change speed gears or elements of an automobile transmission gearing whereby the changing of such gears is facilitated and the manual manipulation of a hand lever for such purpose, as heretofore required, is rendered unnecessary.

One of the primary objects of the present invention is to provide a novel and improved automatic gear changing mechanism which may be readily applied to transmission gearings of the types commonly used upon automobiles without requiring alteration or modification thereof, and which is capable of operating with certainty to effect the gear changes as desired by the automobile driver.

Another object is to provide mechanism of this character which is so constructed and controlled that each speed changing element of the transmission gearing, after it has been shifted into one or another of its operative positions, will be held in such position until released therefrom by the operator when it is desired to shift such element to another operative position or to neutral or inoperative position.

Another object is to provide, in a gear shifting mechanism of this class, means operative automatically to return each gear changing element to neutral or inoperative position before each gear change is made.

Another object of the invention is to provide novel and improved controlling means for gear shifting mechanism of this class whereby such mechanism may be automatically set progressively or retrogressively for the different gear changes in accordance with the increasing or decreasing speed of the automobile, or may be set manually by the driver to select any desired speed change, before the gear changes are actually made, the gear changes thus selecting automatically according to the speed of the automobile or manually by the driver, being actually made when desired by a controlling device operative by the automobile driver.

Another object is to provide an electric speed responsive switch for automatically selecting the different gear changes according to the speed of the automobile and which is readily adjustable to advanced or retarded positions, whereby the speeds at which the different gear changes are set to be made may be varied to suit the desires of the automobile driver.

Another object of the invention is to provide shifting mechanism of this class embodying novel and improved means for controlling the speed at which the gear changing elements are shifted in making the different gear changes, such controlling means being adjustable to enable the speed of the gear changes to be varied as may be required to avoid clashing of the gears.

A further object of the invention is to provide an electrically-controlled fluid pressure operated gear changing mechanism which may be readily and inexpensively applied to automobiles and which is capable of making the desired gear changes effectively and will require the minimum effort and attention on the part of the automobile driver.

To these and other ends, the invention consists in certain improvements and combinations and arrangements of parts, all as will be hereinafter more fully described, the features of novelty being pointed out more particularly in the claims at the end of this specification.

In the accompanying drawings:—

Figure 1 is a vertical section through a conventional type of automobile transmission mechanism, to which shifting mechanism and controlling means therefor according to the present invention are shown applied;

Figure 2 is a detail vertical section through a portion of the shifting mechanism, taken on the line 2—2 in Fig. 1;

Figure 3 is a vertical section through a portion of the shifting mechanism, taken on the line 3—3 in Fig. 1, the shifting mechanism being shown in this figure in its normal position;

Figure 4 is a view similar to Fig. 3 but showing the shifting mechanism set to operate one of the gear shifting or changing members of the transmission mechanism;

Figure 5 is a detail perspective view of one of the pistons of the shifting mechanism;

Figure 6 is a plan or face view of the speed responsive controlling switch for the shifting mechanism;

Figure 7 is a section taken on the line 7—7 in Fig. 6;

Figure 8 is a detail view, on an enlarged scale and in section, showing means for disconnecting the controlling contact member of the switch from its speed responsive operating means, whereby such contact member may be set manually;

Figure 9 is a transverse section taken on the line 9—9 in Fig. 8;

Figure 10 is a transverse section taken on the line 10—10 in Fig. 9;

Figure 11 is a detail view of the circuit completing and neutralizing switches of the shifting mechanism, the same being shown in normal condition;

Figure 12 is a view similar to Fig. 11 but showing the neutralizing switch in closed position;

Figure 13 is a detail view of the neutralizing switch shown in Figs. 11 and 12;

Figure 14 is a section taken on the line 14—14 in Fig. 11;

Figure 15 is an electrical diagram showing the circuits connecting the elements of the shifting mechanism and its controlling means;

Figure 16 is a detail vertical section of a modified form of shifting mechanism;

Figure 17 is a transverse vertical section taken on the line 17—17 in Fig. 16;

Figure 18 is a view similar to Fig. 16 but showing one of the pistons connected to the respective gear changing member of the transmission mechanism and in actuated position;

Figure 19 is an end elevation, partly in section on line 19—19 of the shifting mechanism shown in Fig. 16 as viewed from the left in that figure;

Figure 20 is a detail view, partly in section, showing the means for connecting each piston of the shifting mechanism to the respective gear changing member of the transmission mechanism;

Figure 21 is an end elevation of an automobile transmission mechanism having a shifting mechanism as shown in Fig. 16 applied thereto, and embodying means for supplying fluid pressure to operate such shifting mechanism;

Figure 22 is a vertical section taken on the line 22—22 in Fig. 21; and

Figure 23 is an electrical diagram showing the electrical connections between the elements of a shifting mechanism as shown in Fig. 16 and the controlling devices therefor.

Similar parts are designated by the same reference characters in the different figures.

Gear changing or shifting mechanism according to the present invention is applicable generally to variable speed mechanisms of various kinds, but it is applicable more particularly to automobile transmission mechanisms as commonly used upon automobiles and embodying sliding gears or gear changing elements for effecting the different gear changes. Preferred embodiments of the invention are shown in the accompanying drawings and will be hereinafter described in detail, but it is to be understood that the invention is not restricted to the particular constructions shown since equivalent constructions are contemplated and such will be included within the scope of the claims.

In the present instance, wherein the invention is shown applied to an automobile transmission mechanism of a conventional type commonly used upon automobiles, 1 represents the housing or casing of the transmission mechanism, 2 the clutch or driving shaft thereof which may be driven through the usual clutch controlled by the conventional clutch pedal 3 pivoted as usual to rock forwardly and rearwardly on the axis of its supporting shaft 4 as a center, 5 represents the driven or propeller shaft which is connected in the usual manner to the rear or driving wheels of the automobile, 6 represents the countershaft of the transmission driven from the clutch shaft 2 by the usual gears 8, the countershaft having first and second speed gears 9 and 10 and a reverse gear 11 fixed thereon and the main shaft 7 having sliding gear element 12 and clutch element 13 splined thereon.

The sliding gear 12 may be moved forwardly into mesh with the first speed gear 9 or rearwardly to mesh it with the reverse gear connected to the reverse gear 11, and the clutch element 13 may be shifted rearwardly to clutch it with a clutch element 14 connected to a gear 15 fixed on the main shaft 7 and meshing with the second speed gear 10 or it may be moved forwardly to engage it with the third or high speed clutch element 16 which is fixed on the driving or clutch shaft 2. The sliding gear 12 has a collar thereon with which a shifting fork 17 attached to the reciprocatory shifting bar 18 engages, and the second and high speed clutch element 13 has a collar with which a shifting fork 19 fixed to a reciprocatory shifting bar 20 engages. The transmission mechanism as described is of a conventional form commonly used on automobiles and the different gear changes are made by shifting of the bars 18 and 20 in the appropriate directions, as is well understood by those skilled in the art.

Preferably and as shown in the present instance, the shifting mechanism is applied to the transmission mechanism in a manner which avoids the necessity of altering or modifying the construction of the transmission proper, the shifting mechanism being contained in a casing or housing 21 which is bolted or otherwise attached to the top of the transmission in place of the usual cover plate.

According to the embodiment of the invention shown in Figures 1 to 15 inclusive, the shifting mechanism comprises a cylinder 22 which is rigidly fixed to and supported by the removable cover 23 of the housing 21, the cylinder containing a pair of pistons 24 and 25 which are of similar construction but are oppositely positioned in the cylinder so that they may reciprocate toward and from the respective ends thereof and are adapted to be acted upon by fluid pressure, preferably oil introduced into the cylinder at the center of the length thereof and between the pistons, through a pipe 26. The pistons have cylindrical rods 27 and 28 fixed thereto, as by pins 29 and 30 so that these rods will reciprocate and rotate with the respective pistons, and these rods are splined at their outer ends as at 29' and 30' and are movable outwardly through circular openings 31 and 32 formed in the heads 33 and 34 which close the respective ends of the cylinder, and into chambers 35 and 36 which are fixed to the respective cylinder heads. Compression springs 37 and 38 contained in these chambers act on the ends of the respective piston rods in a direction to move the pistons attached thereto inwardly or toward one another, and the cylinder has a rib 39 formed therein centrally of its length to limit the inward movements of the pistons and to normally center them midway of the length of the cylinder under the action of their springs.

The pistons may rotate as well as reciprocate in the cylinder, and they are individually rotatable by arms 40 and 41, the inner ends of which have splines which engage the splines on the rods of the respective pistons, these arms extending outwardly through segmental slots 42 and 43 formed in the upper side of the cylinder, the upper ends of these arms being connected to the movable armatures or cores 44 and 45 of a pair of double solenoids 46 and 47. Each of these solenoids, as shown in detail in Figure 2, has a pair of windings 48 and 49 thereon which, when energized, will act to move the armature or core in one or the other direction, and each solenoid contains a pair of springs 50 and 51 which are of equal strength and normally balance one another when the solenoid core or armature is in an intermediate position between the solenoid windings, as shown in Figure 2, one or the other of these springs acting to return the solenoid core or armature to such intermediate position when the solenoid is de-energized. By this arrangement the energizing of one or the other winding of one or the other solenoid 46 or 47 will act on the respective arm 40 or 41 to rotate the respective piston from the normal or intermediate position shown in Fig. 2 or 3 into the position shown for example in Fig. 4 or in a position opposite thereto.

Each of the pistons 24 and 25 is formed at its lower side with a lug or extension 52 or 53, and the cylinder has stops 54 and 55 fixed thereto at the outer sides of and in alignment with the lugs 52 and 53 when the pistons are in their normal position as shown in Figs. 2 and 3. The reciprocatory shifting bars 18 and 20 are provided, at opposite sides of each of the stops 54 and 55, with actuating lugs 56 and 57 which are rigidly fixed thereto and extend upwardly therefrom and are movable longitudinally in slots formed in the bottom of the cylinder at opposite sides of the respective stops 54 and 55.

While the shiftable gear changing elements of the transmission mechanism are in their normal neutral or inoperative positions as shown in Fig. 1, the shifting bars 18 and 20 will be in their central positions with respect to their strokes and the pairs of actuating lugs 56 and 57 thereon will be positioned in opposite relations at the opposite sides of the stops 54 and 55 and immediately beyond the outer ends of the lugs 52 and 53 on the respective pistons, which will then be in their innermost positions as shown in Fig. 1. When a winding of one or the other of the solenoids 46 and 47 is energized, the respective piston 24 or 25 will be rotated in the cylinder by its respective arm 40 or 41, thus removing the lug 52 or 53 on such piston from a position in line with the fixed stop 54 or 55 and bringing such lug into line with one or another of the actuating lugs 56 and 57 on the shifting bars 18 and 20, as, for example, is shown in Fig. 4. Introduction of fluid pressure into the cylinder between the pistons through the pipe 26 will then cause the piston so rotated and coupled to one of the shifting bars, to shift this bar and the sliding gear changing element connected thereto in a direction to effect a gear change in the transmission mechanism, the other piston at this time having its lug positioned in alignment with the fixed stop in the cylinder so that it will be locked against outward movement under the action of the fluid pressure introduced between the pistons. Since the shifting bar 18 is shiftable in one or the other direction from its neutral position by the pistons 24 and 25 when such pistons are rotated to bring the lugs 52 and 53 thereon into line with the actuating lugs 56 and 57 on this bar, to shift the gear 12 into position for first speed or reverse, and the shifting bar 20 is shiftable in one direction or the other from its neutral position by the pistons 24 and 25 when the latter are rotated to bring the lugs 52 and 53 thereon into line with the actuating lugs 56 and 57 on this bar, when the pistons are rotated in the opposite direction, to shift the slidable gear changing element 13 into positions for second speed or high speed, any one of these gear changes in the transmission mechanism may be effected by rotation of the appropriate piston in the proper direction by appropriate energization of the respective solenoid, followed by the admission of fluid pressure to the cylinder between the pistons, the piston which is inactive during each gear changing operation being locked against outward movement. Each of the shifting bars 18 and 20 is provided with a pair of opposed springs 18ᵃ connected to the center thereof and to the respective ends of the transmission casing, each of these pairs of springs being balanced when the respective shifting bars are in neutral position, these springs serving to return the respective shifting bars to neutral position and to retain them in neutral position when they are not acted on by the pistons.

Each of the solenoids 46 and 47 are attached to a wall of the enclosing casing 21, and in order to compensate for the arcuate movement of the respective arm 40 or 41 to which the reciprocatory cores or armatures of these solenoids are connected, each solenoid may be pivoted at 58 to a bracket 59 attached to said casing, as shown in Fig. 2. In order to retard or otherwise control the speed at which each piston 24, 25 operates to effect each gear change, the chambers 35 and 36 into which the outer ends of the rods of these pistons are movable are provided with air ports 60 and 61 beyond which the ends of the piston rods are movable as the pistons move outwardly, the outer ends of these chambers being closed so that air will be trapped in these chambers between their ends and the ends of the respective piston rods, thereby cushioning or retarding the outward movements of the respective pistons. In order to control the retarding effect thus produced and thereby vary the speed at which the gear change is made, the outer ends of the chambers 35 and 36 may be closed by screw plugs 62 and 63 which are adjustable axially in these chambers whereby the degree of compression of air therein may be regulated. In addition to the controlling means thus provided, or as an alternative therefor, the ends of each shifting bar 18 and 20 may be arranged to move into chambers 64 and 65 formed in the opposite end walls of the transmission casing, these chambers having ports 66 and 67 leading therefrom near their inner ends back into the interior of the transmission casing and having other relatively smaller ports 68 and 69 leading from their outer ends back into the interior of the transmission casing, the restricted outlets from the chambers 64 and 65 provided by the ports 68 and 69 metering or restricting the escape of air from these chambers and thereby controlling the speed at which the gear changes are effected, it being understood that these metering chambers may be provided at both ends of both of the shifting bars 18 and 20.

Different means may be provided for supplying fluid pressure through the pipe 26 to the cylinder to actuate the pistons therein. As shown in Fig. 1, an oil pump is provided for this purpose which is operated by the clutch pedal 3 of the automobile. The oil pump as shown comprises a cylinder 70 having a port 71 therein to receive oil from an oil reservoir 72, the cylinder containing a piston 73 which is reciprocable therein and provided with a spring 74 to assist in returning it to its retracted position beyond the oil supply port 71 when oil is allowed to flow back into the cylinder 70 from the cylinder 22, in the manner hereinafter described, the discharge or delivery end of the cylinder being connected to the pipe 26, the cylinder and its reservoir being fixed to a suitable stationary part of the automobile. The piston is actuated by a rod 75 which is slidable through a guide 76 and is arranged to bear against the outer side of the piston, the rod 75 having a yoke 77 thereon of longitudinally elongated form, in which a pin 78 on the clutch pedal 3 operates. The yoke 77 is of sufficient length to allow the clutch pedal 3 to be actuated or swung to the left in Fig. 1 sufficiently far to fully disengage the usual driving clutch on the automobile, whereupon the pin 78 will engage the end of the yoke 77, and further actuation of the clutch pedal in the same direction and while the clutch is disengaged will force the piston 73 into the cylinder 70, forcing oil therefrom through the pipe 26 into the cylinder 22 to actuate the piston therein which has been set for a gear changing operation.

Means is provided for holding each slidable gear changing element in its operative position after it has been moved into such position to effect a gear change, such means comprising a check valve 80 which is connected in the oil or fluid pressure supply pipe 26 so that it will admit fluid pressure to the cylinder 22 to effect a gear change but will prevent return flow of oil or fluid pressure from said cylinder back to the pump cylinder 70, thereby maintaining the piston 24 or 25 which has been actuated in its actuated position. Suitable means is provided for operating the check valve 80 to release the oil or fluid pressure from the cylinder 22 and permit it to flow back into the pump cylinder 70, in order that the piston which has been operated and the shiftable gear changing element operated thereby, may return to normal or neutral position, the releasing means for the valve 80 embodying preferably a solenoid 81 having a movable core or armature 82 which is arranged to act on the valve 80 to open or unseat it when the solenoid is energized. The solenoid core may be returned to normal position by a spring 83 when the solenoid is de-energized, and the check valve may be normally held seated by a spring 84. The back flow of oil or fluid from the cylinder 22 under the influence of the spring 37 or 38, when released by opening of the valve 80, allows the pump piston 73 to return to its normal retracted position it being understood that the spring 74 is not of sufficient strength to return the pump piston 73 from its actuated position to normal position until the valve 80 is opened. The yoke 77 on the pump plunger operating rod 75 is of sufficient length to allow the clutch pedal 3 to return to clutch engaging position while the pump plunger 73 remains in its actuated position in the pump cylinder until released by the opening of the valve 80.

The present invention provides controlling means for the solenoids 46 and 47 which enables the shifting mechanism to be set automatically for different gear changes in accordance with the speed of the automobile, and such controlling means is adjustable so that its operation may be advanced or retarded and it is also capable of manual operation so that the automobile driver may, if desired, select the different gear changes as desired. Such controlling means, as shown in the present instance, comprises a speed responsive device which may consist of a speedometer 90 located upon any desired part of the automobile, it being shown in the present instance as mounted in the hub of the usual steering wheel 91 and supported non-rotatably by a relatively fixed sleeve 90ª in the steering column. The driving shaft 92 of this speedometer is driven from any suitable part of the automobile, as from the driving or propeller shaft 5 through the shaft 93 and gears 94 and 95, the speed indicating pointer 96 cooperating with a suitably graduated dial 97 which is secured to the stationary casing 98 of the speedometer. The indicator shaft 99 of the speedometer on which the speed indicating pointer 96 is mounted, and which may be operated by the usual speedometer mechanism, extends through a pair of glass or other transparent plates 100 and 100ª, and is provided, at its outer end, with a knob 101 to which an arm 102 carrying a contact brush 103 is fixed, as by a set screw 104, and the casing 98 of the speedometer is provided with an annular rim 105 which is rotatable on the casing 98 and is provided interiorly with a ring 106 of insulating material, this insulating ring having a set of contacts 107, 108, 109, and 110 inserted therein and which the contact brush 103 may engage as the brush 103 rotates with the shaft 99 in accordance with variations in the speed of the automobile. The contacts 107, 108, 109 and 110 are connected to the appropriate windings of the solenoids 46 and 47 to render these solenoids operative to set the pistons 24 and 25 appropriately in actuating relation with the shifting bars 18 and 20 of the transmission mechanism, the contact 107 being connected for example to the winding of the solenoid 47 so that this solenoid when energized will rotate the piston 25 into a position to actuate the shifting bar 18 for reverse gear, the contact 108 being connected to the winding of the solenoid 46 so that this solenoid when energized will rotate the piston 24 into a position to actuate the shifting bar 18 for first speed, the contact plate 109 being connected to the winding of the solenoid 47 which will cause this solenoid when energized to rotate the piston 25 into a position to actuate the shifting bar 20 for second speed, and the contact plate 110 being connected to the winding of the solenoid 46 so that when this solenoid is energized it will rotate the piston 24 into a position to actuate the shifting bar 20 for third or high speed. These contact plates are shown so connected in the diagram, Fig. 15. Normally, the rotating contact brush 103 will rest on the contact plate 108 adjacent to the zero mark in Fig. 6 while the automobile is not in motion, the shifting mechanism being then set in condition for operation to place the transmission mechanism in first speed, and as the speed of the automobile increases, the contact brush 103 will rotate in a clockwise direction in Fig. 6, traversing the length of the contact plate 108, then engaging and traversing the length of the contact plate 109, and then engaging and traversing the contact plate 110, the movement of the contact brush 103 progressively over these contact plates setting the shifting mechanism automatically for changes from first speed to second speed and from second speed to high speed forward.

In order to enable the contact brush 103 to be brought manually into engagement with the contact plate 107 in order to set the shifting mechanism in reverse gear, and to also enable the operator to set the shifting mechanism for any desired gear change manually and selectively, independently of the speed of the automobile, the knob 101 is provided with means for detachably connecting it to the speed responsive shaft 99, it being mounted for movement axially on said shaft and provided with sockets 111 to receive lugs 112 on the shaft when said knob occupies one of its axial positions, so that the knob will then rotate in unison with the shaft 99 by the coupling thus established, and when the knob is pulled upwardly or shifted into another axial position on the shaft 99, the lugs 112 on said shaft will be disengaged from the sockets 111 in the knob 101 and the latter may then be rotated manually, independently of the shaft 99, and the contact brush 103 may then be brought into engagement with any one of the contact plates 107, 108, 109 and 110, as desired by the driver. In order to retain the knob 101 in either of said axial positions on the shaft 99, the latter is provided with a circumferential groove 113 which contains an annular spring 114 and the interior bore of the knob is provided with circumferential grooves 115 and 116 in which said spring may engage yieldingly, as shown in detail in Fig. 8. By rotating the annular rim 105 on the stationary casing 98, the contact plates 107, 108, 109 and 110 which are carried by this rim will be advanced or retarded with respect to the position assumed by the rotating contact brush 103 in response to different speeds of the automobile, and the speeds at which the different gear changes are set to be made may thus be varied to suit the desires of different drivers. The rotative rim 105 may be secured in its different adjusted positions by a clamping nut 117 which may be threaded on a stud fixed in a side of the stationary casing 98 and extending through a segmental slot 118 in the rim 105.

Simple and conveniently operable means is provided for returning the shiftable gear changing elements of the transmission mechanism to neutral between gear changes and for completing the circuit made through any one of the selector solenoid windings by the speed responsive selector switch hereinbefore described. Preferably and as shown in the present instance the means for performing these two functions are combined in a single device which may be located in any position on the automobile convenient for operation by the driver thereof. This device, shown more particularly in Figs. 11 to 14 inclusive, comprises a square plunger 120 which is fitted to reciprocate in a rectangular bracket 121 which may be fixed to a suitable part of the automobile, this plunger being normally and yieldingly held in upright raised position by a spring 122, the plunger being formed with a vertical slot 123 through which a pin 124 in the bracket 121 extends to limit the vertical reciprocating movements of the plunger and on which the plunger may rock as a center. A triangular cam 125 is mounted adjacent to an extension 126 of the plunger, this cam being mounted to rotate on a shaft 127 supported in the bracket 121, the shaft 127 being offset to one side of the plunger and the cam 125 being provided adjacent to each apex thereof with a recess 125a in which the lower end of the plunger extension 126 may engage so that each downward stroke of the plunger will cause it to act on the cam and to rotate it through one-third of a revolution. The next following apex of the cam may assume an operative position beneath the plunger extension by deflecting the plunger laterally about the pin 124 as a center such being permitted by the lateral yield of the spring 122. A second cam 128 is fixed to the cam 125 to rotate therewith, this cam having lobes 129 which are located opposite to the flat sides of the cam 125, and the cam 128 cooperates with a roller 130 carried by a plunger 131, the latter being guided to reciprocate in a guide 132 fixed on the bracket 121 and arranged to make electrical contact with an electric switch or contact member 132' attached to the bracket 121 but insulated therefrom, when the roller 130 of the plunger rides on one of the lobes of the cam 128.

A coiled compression spring 133 is interposed between the guide 132 and a collar 134 on the plunger 131, this spring acting to force the roller 130 against the cam 128 yieldingly and to maintain it in contact therewith. Normally, the roller 130 rests in the depression between adjacent lobes on the cam 128 and one of the sides of the cam 125 is in position to be engaged by the lower or forward end of the plunger 120, as shown in Fig. 11, the spring 133 yieldingly holding the cams in such position. Depression of the plunger 120 causes it to act on the cam 125 to rotate it, the concurrent rotation of the cam 128 causing the roller 130 to ride up on to one of the lobes 129 thereof, as shown in Fig. 12, and as soon as the center of this lobe has passed the center of the roller 130, the latter, acting under the spring 133, will ride down the other side of this lobe, thereby completing a one-third revolution of the cams. The plunger 120 carries an electrical contact 135a which is insulated therefrom, and a pair of cooperating electrical contacts 135 and 136 are mounted on the bracket 121 and insulated therefrom, the contact 135a being so located on the plunger 120 that it will come into engagement with and bridge the contacts 135 and 136 by further depression or actuation of the plunger 120, following the riding of the roller 130 over the center of a lobe on the cam 128. The switch or contact member 132' controls the circuit through the releasing solenoid 81 of the valve 80 and the contacts 135 and 136, when bridged by the contact 135a, complete the electrical circuit made through any one of the windings of the selector solenoids for the shifting mechanism. The plunger 120 may be located in any suitable position for convenient operation by the automobile driver, as for example on the floor board or instrument board of the automobile, it being shown in the present instance as located beneath the rear or heel end of the accelerator pedal 137 which is pivoted at 138 and connected as usual to the throttle of the automobile engine to control the operation thereof, the location of the plunger 120 beneath the accelerator pedal enabling it to be conveniently depressed by the driver by rocking the accelerator pedal in a reverse direction to that which opens the throttle.

The electrical circuit for the shifting mechanism provided by the present invention is relatively simple. The usual storage battery B as used upon automobiles for starting, lighting and other purposes, may be utilized as the source of electrical energy for the electrical devices employed in the shifting mechanism, one terminal of the battery being grounded to the frame of the automobile as usual and as indicated, the other terminal of the battery having a conductor 140 leading therefrom to the contact member 135 on the plunger 120 and another conductor 141 leading from the contact member 136 to a junction point 142 from which four conductors 143 lead respectively to the windings of the double solenoids 46 and 47, these windings of the solenoids being connected by four conductors 144 which may form a cable and are connected respectively to the contact plates 107, 108, 109 and 110 of the speed responsive selector switch, the rotating arm 103 of this switch being grounded to the frame of the automobile through the speedometer shaft on which the contact arm 103 is mounted. A conductor 145 also leads from the battery to the switch or contact member 132', this conductor including in circuit therewith the solenoid 81 of the fluid pressure release valve 80, and the plunger 131 which cooperates with the switch member 132' is grounded to the frame of the automobile.

The operation of the shifting mechanism hereinbefore described is as follows:—Normally and while the automobile is at a standstill, the pump plunger 73 will be in its retracted position and the clutch pedal 3 in its rear position corresponding to the engaged position of the clutch; the rotating brush 103 of the cylinder switch will rest on the contact plate 108 opposite to the zero speed mark (Fig. 6), and the plunger 120 will be in its raised or retracted position shown in Fig. 11, the contact 135ª being disengaged from the contacts 135 and 136 and the plunger 131 disengaged from the switch contact 132'. Since the contacts 135 and 136 are in series with the selector solenoids and the contacts of the selector switch, these solenoids will be de-energized and the springs 50 and 51 therein will hold their cores or armatures in the mid positions so that the pistons 24 and 25 will occupy the mid positions of rotation with the lugs 52 and 53 thereon in line with the stops 54 and 55, as shown in Figs. 2 and 3; these pistons then occupying their innermost positions under the action of their springs 37 and 38 as shown in Fig. 1 since no fluid pressure will be supplied to the cylinder 22 by the pump plunger 73. The valve 80 at this time will also be free to act as a check valve since the circuit of its releasing solenoid 81 will be open by reason of the disengagement of the plunger 131 from the switch contact 132'.

The automobile is started in first gear by depressing the plunger 120, then pushing the clutch pedal 3 forwardly and then allowing it to return to its normal position and then applying power from the engine to drive the automobile in the usual manner. Depression of the plunger 120 completes the circuit from the battery through the winding of the solenoid 46 connected to the selector switch contact plate 108 which is then engaged by the rotating contact 103, the solenoid 46 then operating through its arm 40 to rotate the piston 24 in a direction to bring its lug 52 in line with the actuating lug 56 on the shifting bar 18 connected to the first speed gear 12, and the subsequent actuation of the clutch pedal 3 first disengages the usual driving clutch between the engine and transmission mechanism as usual, the pump plunger 73 remaining stationary during this operation due to the movement allowed for the pin 78 in the yoke 77, and after the clutch has been fully disengaged, further actuation or forward movement of the clutch pedal 3 causes the pin 78 to engage the forward end of the yoke 77 and to thereby force the pump plunger 73 into the pump cylinder 70. This movement of the pump plunger forces oil or fluid from the pump cylinder through the valve 80 and the pipe 26 into the cylinder 22 between the pistons 24 and 25 therein. Since the piston 25 will be locked against outward movement by the engagement of its lug 53 with the stationary stop 55, the piston 24 which was previously rotated to bring its lug 52 into line with the actuating lug 56 on the shifting bar 18, will move outwardly or toward the left in Fig. 1 under the action of the fluid pressure thereon, thereby moving the shifting bar 18 and the gear 12 into engagement with the first speed gear 9. The piston 24 will be held in its actuated position and thereby maintain the gear 12 in mesh with the first speed gear 9, by closing of the valve 80 which functions as a check valve to prevent back flow of the oil or fluid from the cylinder 22.

As the speed of the automobile is accelerated, as usual in starting, the rotating contact brush 103 advances over the contact plate 108, in response to such acceleration and eventually passes off the plate 108 on to the plate 109. This plate 109 is connected to the winding of the solenoid 47 which, when energized will cause the solenoid to act through its arm 41 to rotate the piston 25 into a position to bring the lug 53 thereon into line with the actuating lug 57 on the shifting bar 20 which is connected to the sliding clutch or gear changing element 13. Change to second speed is made by depressing the plunger 120 and then pushing the clutch pedal 3 forwardly and then releasing it. The first part of the stroke of the plunger 120 will cause it to act on the cam 125 and rotate it and the cam 128 into the position shown in Fig. 12, a lobe on the cam 128 then acting on the plunger 131 to bring it into contact with the switch contact 132' which is in circuit with the releasing solenoid 81 for the valve 80, the circuit of this solenoid being thereby closed, causing its plunger to open or unseat the valve 80 and thereby permit the oil or fluid to flow back from the cylinder 22 into the pump cylinder 70 and thus allowing the previously actuated piston 24 to move inwardly and return to its normal position against the stop 39 under the action of its spring 37, thereby returning the shifting bar 18 and the gear 12 connected thereto to neutral position, and the further descent or actuation of the plunger 120 and the consequent further rotation of the cam 128 allows the plunger 131 to disengage from the switch contact 132', thus de-energizing the releasing solenoid 81 so that the valve 80 may close, after which the contact 135ª engages the contacts 135 and 136, thus completing the circuit through the appropriate winding of the solenoid 47 whereupon the latter operates through its arm 41 to rotate the piston 25 in a direction to bring its lug 53 in line with the actuating lug 57 on the shifting bar 20. The subsequent actuation of the clutch pedal 3 forces the pump plunger 73 into the pump cylinder 70 forcing oil or fluid therefrom through the valve 80 and pipe 26 into the cylinder 22, and since the piston 24 after returning to its innermost position, is brought by the springs 50 and 51 into the mid position with its lug 52 in line with the stop 54, this piston will be locked against movement and the piston 25 will be forced outwardly by the fluid pressure acting thereon and will shift the bar 20 and the clutch element 13 thereon in a direction to engage it with the second speed clutch element 14 and gears 15 and 10, thereby placing the transmission mechanism in second speed. Acceleration of the speed of the automobile will carry the rotating contact brush 103 off the contact plate 109 on to the contact plate 110, which is connected to the winding of the solenoid 46 which when energized will rotate the piston 24 into a position to bring its lug 52 in line with the actuating lug 56 on the shifting bar 20. The change is made to third or high speed while the contact brush 103 engages the contact plate 110, by depressing the plunger 120 and then actuating and releasing the clutch pedal 3, such actuation of the plunger 120 closing the circuit through the releasing solenoid 81 for the valve 80 by causing engagement of the plunger 131 with the switch contact 132', thereby opening the valve 80 and permitting escape of oil or fluid pressure from the cylinder 22 and thereby allowing the piston 25 to return to its normal innermost position against the stop 39 under the action of its spring 38, the de-energizing of the solenoid 47 by the passing of the contact brush 103 beyond the contact plate 109 allowing the springs in this solenoid to rotate the piston 25 back to its mid position with its lug 53 in line with the stationary stop 55 so that this piston will be locked against outward movement, and actuation of the clutch pedal will force the pump plunger 73 into the pump cylinder 70, thereby forcing oil or fluid through the pipe 26 into the cylinder 22, causing the piston 24 which will then engage the actuating lug 56 on the shifting bar 20 outwardly toward the left in Fig. 1, thereby shifting the bar 20 and the clutch element 13 connected thereto so as to engage the latter with the third or high speed clutch element 16, the check valve 80 preventing back flow of oil or fluid from the cylinder and thereby holding the sliding clutch or gear changing element 13 in third or high speed position. The transmission mechanism may be brought to a neutral or non-driving condition by depressing the plunger 120, the consequent engagement of the plunger 131 with the switch contact 132' energizing the releasing solenoid 81 for the valve 80, thereby opening the latter and permitting oil or fluid pressure to flow from the cylinder 22 back to the pump cylinder 70, thereby allowing the piston 24 to return to its normal innermost position against the stop 39 under the action of its spring 37, the sliding gear changing element 13 being thereby returned to its normal neutral position as shown in Fig 1. The transmission mechanism is set in reverse by pulling upwardly and unclutching the knob 101 from the shaft 99 and then rotating this knob manually to bring the contact brush 103 into engagement with the contact plate 107 which is connected to the winding of the solenoid 47 which, when energized, will rotate the piston 25 into a position to bring its lug 53 into line with the actuating lug 57 on the shifting bar 18 to which the gear 12 is connected, and then depressing the plunger 120 and thereafter actuating the clutch pedal 3, the consequent engagement of the plunger 131 with the switch contact 132' energizing the releasing solenoid 81 for the valve 80, thereby opening said valve and allowing back flow of oil or fluid from the cylinder 22 into the pump cylinder 20, thereby permitting either piston which was in actuated position to return to its normal position, thereby restoring the transmission mechanism to neutral, and the engagement of the contacts 135 and 136 completing the circuit through the winding of the solenoid 47 which rotates the piston 25 into position to actuate the shifting bar 18 toward the right in Fig. 1 to bring the sliding gear 12 into engagement with the reverse gears in the transmission mechanism, the subsequent actuation of the clutch pedal causing the pump piston 73 to force the oil or fluid into the cylinder 22 to actuate the piston 25 to so shift the shifting bar 18.

By rotating the rim 105 carrying the contact plates 107, 108, 109 and 110 in either direction on the casing 98, the speed ranges of the automobile within which the speed responsive contact brush 103 engages with these plates to set the selector solenoids for the different speed changes may be advanced or retarded, as desired. Also, while the knob 101 is uncoupled from the speed responsive shaft 99, the contact brush 103 connected to the knob may be engaged selectively with any one of the contact plates 107, 108, 109 and 110, so that the shifting mechanism may be operated selectively as desired by the driver.

Figures 16 to 20 inclusive show another form of shifting mechanism which may be employed, wherein a pair of fluid pressure operated pistons is provided for each gear shifting bar of the transmission and the pistons are connected to the respective shifting bar under the control of individual solenoids. In this embodiment of the invention, the reciprocatory shifting bars 18ᵃ and 20ᵃ, corresponding to the shifting bars 18 and 20 in Fig. 1, are provided with recesses 18ᵇ and 20ᵇ in their longitudinal edges, and a pair of fluid pressure cylinders 22ᵃ and 22ᵇ are provided, one for each shifting bar. These cylinders may be rigidly connected together as by a web 140', and the cylinders may be rigidly or immovably supported in the upper portion of the transmission case above the shifting bars therein, by a plate 141' to which it may be bolted, this plate being suitably supported rigidly in the transmission case. Each of the cylinders 22ᵃ and 22ᵇ contains a pair of opposite pistons 24ᵃ and 25ᵃ adapted to receive fluid pressure between them from a pipe 26ᵃ to force one or the other of these pistons from its normal innermost position as shown in Fig. 16 outwardly as shown in Fig. 18. The outer ends of each cylinder contain plungers 142' and 143' which are movable into and out of engagement with the recesses in the respective shifting bars, the upper ends of these plungers forming cores 144' and 145' for individual solenoids, those for the cylinder 22ᵇ being designated 146 and 147 and those for the plungers in the cylinder 22ᵃ being designated 148 and 149. The core of each solenoid is slidable vertically in a tubular guide 150 formed within each solenoid as a part of a bracket 151 on which the respective solenoid is mounted, and each of these brackets is mounted on the upper side of the respective cylinder to slide longitudinally thereon, clips 152 being provided for holding each solenoid bracket in place on the cylinder while permitting longitudinal movement thereof. The core of each solenoid extends upwardly through a longitudinal slot 153 in the top of the cylinder. The top of each guide 150 is closed by a cap 154, and each solenoid core is of tubular form and contains a tension spring 155, the upper end of which is connected to the cap 154 as by an adjusting nut 156 threaded on its upper end and the lower end of each spring is connected to the respective plunger by a cross pin 157 fitted therein, each spring acting to lift the respective plunger and its solenoid core and to yieldingly maintain such plunger and core in raised position so that the plungers will be normally disengaged from the respective shifting bars. Each plunger is in the form of a cross, the inner horizontal arms 158 of which are guided to slide vertically in vertical slots 159 formed in the respective pistons and the outer arms 160 of which are guided to slide vertically in guides 161 formed on the inner sides of the respective cylinder heads 162, and springs 37ᵃ and 38ᵃ are interposed between the respective plungers and the outer cylinder heads and act to move the respective pistons inwardly to their normal innermost positions and to retain them in such positions when not acted on by fluid pressure. The outer cylinder heads are each provided with an opening 163 through which the outer arm 160 of each plunger may move outwardly when such plunger is lowered to engage its respective shifting bar, as shown at the left hand end of Fig. 16, the respective piston being then free to move outwardly in its cylinder under fluid pressure to effect a gear change, but when the plunger is in its normal raised position as shown at the right hand end of Fig. 16, the outer arm thereon will be blocked by the cylinder head and the respective piston will then be locked against outward movement under the action of fluid pressure, such plunger being then disconnected from the respective shifting bar of the transmission mechanism.

Figs. 21 and 22 show the shifting mechanism shown in Figs. 16 to 20 inclusive applied to transmission mechanism provided with means for supplying oil or fluid under constant or continuous pressure for actuating the shifting mechanism, the transmission mechanism being provided with a gear pump 170 which may be driven continuously from the transmission gearing by the gears 171, this pump receiving oil from the transmission casing through an inlet 172 and the outlet or delivery side of the pump being connected to a valve 173 having a return pipe 174 leading therefrom back to the transmission casing and also having a pipe 175 which is connected to the pipe 26ª which supplies fluid pressure to the cylinders of the shifting mechanism, a pressure relief valve 176 being connected to the pipe 175 to relieve excess pressure that may develop therein and to return the oil thus discharged back into the transmission casing. The valve 173 normally closes the return pipe 174 so that pressure will be maintained in the pipe 175 under control of the relief valve 176, and a releasing solenoid 177 is provided for opening the valve 173 and thereby relieving the pressure in the pipe 175 by permitting the oil or fluid delivered by the pump to be returned to the transmission case through the pipe 174. The stem of the valve is provided for this purpose with a plunger 178 which serves as an armature or core for the solenoid 177 so that when the latter is energized it will lift and open the valve 173, a spring 179 acting on the valve plunger to return it to closed position and retain it in such position. This constant or continuous means for supplying fluid pressure to actuate the shifting mechanism may be used in place of the pedal actuated pump hereinbefore described as shown in Fig. 1.

The relief valve 176 is normally held closed by a spring 276 which is adjustable by a screw cap 277 and lock nut so that the constant pressure developed by the pump may be varied as desired.

In the construction shown in Figs. 16 to 20 inclusive, the plungers will all be normally in their raised positions, disconnected from the respective shifting bars of the transmission. Energizing of one of the solenoids lowers the respective plunger so that its lower end engages in the corresponding recess of the respective shifting bar and the outer end 160 of this plunger is brought into alignment with the opening 163 in the respective outer end of the cylinder, as shown at the left hand side of Fig. 16, and admission of oil or other fluid pressure to the cylinder between the pistons therein, through the pipe 26ª, will force the lowered plunger outwardly in the cylinder, thereby shifting the respective shifting bar of the transmission mechanism to effect a gear change. The other piston in the cylinder at this time will remain in its raised position, its solenoid being de-energized and its coupling plunger will be disconnected from the respective shifting bar and it will be locked against movement by the abutting of its outer end against the cylinder head. In this embodiment of the invention, it will be understood that two cylinders are provided, one for each shifting bar of the transmission mechanism, that each cylinder contains a pair of oppositely movable pistons and plungers to cooperate with the respective shifting bar to shift it in either of two directions to effect the gear changes in the transmission mechanism, and that four separate solenoids are provided, one for each plunger, to control the engagement of each plunger with the respective shifting bar.

The shifting mechanism shown in Figs. 16 to 20 inclusive may be connected and controlled in the same manner hereinbefore described respecting the form of the invention shown in Figs. 1 to 15 inclusive, Fig. 23 showing it connected in such a controlling system, 146, 147, 148 and 149 representing the solenoids for controlling the four plungers of the shifting mechanism the windings of which solenoids are connected to the speed responsive selector switch shown in Fig. 6 in the same manner in which these connections are made in Fig. 15, and the circuit through any one of these solenoids is completed by the switch shown in Figs. 11 to 14 inclusive, the contacts 135 and 136 of which are connected in series between the solenoids and the battery B. It will be clear from Fig. 15 that after each solenoid has been energized and has started to shift with its respective plunger to effect a gear change, the plunger which has been lowered by the solenoid will enter the opening 163 in the end of the cylinder and the plunger will be thereby retained in its lowered connected relation with the shifting bar, although the circuit through each solenoid will be broken when the rotating brush 103 of the controlling switch passes off the respective contact. The releasing solenoid 177 for the valve 173 is controlled by the engagement of the plunger 131 with the contact 132' connected in circuit with the solenoid. The engagement of the rotating contact brush 103 in accordance with the speed of the automobile will close the circuit through the appropriate solenoid 146, 147, 148 or 149. depression of the plunger 120 will energize the solenoid 177 thereby opening the valve 173 and relieving the fluid pressure in the pipe 175 and in the cylinders of the shifting mechanism so that any piston therein which may have been in actuated position will be permitted to return to its normal innermost position under the action of its spring, thereby restoring the gear changing element actuated thereby to neutral position, and the final depression of the plunger 120 completes the circuit through the solenoid which was made by the selector switch, thereby energizing that solenoid, which causes lowering of the piston actuated plunger controlled thereby into operating relation with the respective shifting bar of the transmission mechanism, and the fluid pressure, which will be restored in the pipe 175 by the previous closing of the valve 173, will actuate the piston associated with the lowered plunger, thereby effecting the corresponding gear change, the controlling of the circuits of the different solenoids and the effecting of the different gear changes being the same in this embodiment of the invention as in the embodiment thereof shown in Figs. 1 to 15 inclusive.

The present invention provides shifting mechanism for an automobile transmission mechanism which is of unit construction so that it may be readily installed on a conventional form of transmission mechanism without requiring modification or alteration thereof and which, in its mode of operation, performs its gear changing functions in a manner similar to that in which these functions have heretofore been performed manually and to which automobile drivers are accustomed, so that a driver who has acquired the habit of shifting gears manually will be able to readily adopt the automatic control provided by the present invention.

While the speed-responsive selector switch automatically places the different solenoids controlling the speed changing means in circuit to make the different speed changes according to the speed of the automobile, the speed changes are not actually made until desired by the driver, since the solenoid circuit which is closed by the speed responsive switch is not completed until the plunger 120 is depressed by the operator. The speed-responsive solenoid selecting switch, however, automatically determines the gear shift to be made, according to the speed of the automobile, and it accomplishes this result both while the automobile speed is accelerating, in which case the shifting mechanism will be set to make the gear changes progressively from first speed up to high speed, and while the automobile speed is decelerating, in which case the shifting mechanism will be set to make the gear changes retrogressively from high speed down to second or first speed.

The means provided for relatively advancing or retarding the position of the distributing contacts with respect to the rotating contact responsive to the speed of the automobile enables the speed responsive selecting switch to set the shifting mechanism to make the different gear changes within different speed ranges of the automobile to suit the desires of different drivers, the indicator of the speedometer informing the driver of the gear changing element of the transmission engaged at the different speeds of the automobile.

The manual operation of the selecting switch provided for by the present invention enables the driver to make any desired gear changes selectively and at any time independently of the speed of the automobile, as well as to set the transmission mechanism in reverse, as hereinbefore described.

I claim as my invention:—

1. Shifting mechanism for an automobile transmission mechanism embodying a plurality of shiftable gear changing elements, comprising fluid-pressure operative means for shifting said elements, solenoid-controlled means for directly connecting said fluid-pressure operative means to one or another of said elements, a speed controlled and manually controlled electric switch connected to said solenoid-controlled means for controlling the same, and means for supplying fluid pressure to said fluid pressure operative means to actuate the same.

2. Shifting mechanism for an automobile transmission mechanism embodying a plurality of shiftable gear changing elements, comprising fluid-pressure operative means for shifting said elements, solenoid-controlled means for setting said fluid-pressure operative means in operative relation with one or another of said elements, a speed controlled and manually controllable electric switch connected to said solenoid-controlled means for controlling the same automatically according to speed or manually, an electric switch connected in circuit with the solenoid controlled means for completing the circuit therewith, and means for supplying fluid pressure to said fluid pressure operative means to actuate the same.

3. Shifting mechanism for an automobile transmission mechanism embodying a shiftable transmission changing element, comprising fluid pressure operated means for shifting said element, means for supplying fluid pressure to said means to shift said element into an operative gear changing position, means for operatively connecting said fluid pressure operated means to said element, a device for maintaining and releasing the fluid pressure on said fluid pressure means, and controlling means connected to said device and to said connecting means and operative to cause operation of said device to release the fluid pressure on said fluid pressure means and to subsequently cause operation of said connecting means to operatively connect said fluid pressure operated means to said element.

4. Shifting mechanism for an automobile transmission mechanism embodying a shiftable gear changing element, comprising a cylinder having a piston therein provided with means for connecting it to said element for actuating it, means for supplying fluid pressure to said cylinder to actuate said piston to effect a gear change, a valve for releasing fluid pressure from said cylinder to permit the piston therein to return to normal position, and control means operative to control the connection of said piston to said element and to control the release of fluid pressure from the cylinder by said valve.

5. Shifting mechanism for an automobile transmission mechanism embodying a shiftable gear changing element, comprising a cylinder having a piston therein provided with means for connecting it to said element to actuate it, means for controlling said piston connecting means, means for supplying fluid pressure to said cylinder to actuate the piston therein to effect a gear change, a valve for releasing fluid pressure in the cylinder to permit the piston therein to return to normal position, and a control device operative to cause actuation of said valve to release fluid pressure from the cylinder and to then cause actuation of the control means for the piston connecting means to connect the piston to said shiftable gear changing element.

6. Shifting mechanism for an automobile transmission mechanism embodying a shiftable gear changing element and a clutch pedal for controlling the transmission of power, comprising a cylinder having a piston therein provided with means for connecting it to said element to actuate it, means for controlling said piston connecting means, a fluid pressure pump having a lost-motion connection with the clutch pedal for actuation thereby to supply fluid pressure to said cylinder to actuate the piston therein to effect a gear change, said lost motion connection permitting operation of the clutch pedal while said pump is in actuated condition, a check valve for maintaining fluid pressure in the cylinder and having means for actuating it to release such pressure and permit return of fluid to said pump, and a control device operative to cause actuation of said valve to release fluid pressure from the cylinder and to then cause actuation of the control means for the piston connecting means to connect the piston to said shiftable gear changing element.

7. Shifting mechanism for an automobile transmission mechanism embodying a shiftable gear changing element, comprising fluid pressure operated means for actuating said element, electro-magnetic control means for connecting said fluid pressure means to said element, means for supplying fluid pressure to said fluid pressure operated means to actuate it, a check valve for maintaining the fluid pressure on said fluid pressure operated means and having electro-magnetic means for actuating it to release such fluid pressure, and a switch device operative, when actuated, to render said electro-magnetic means for said valve operative to cause release of fluid pressure from said fluid pressure operated means and to subsequently render the electro-magnetic control means for said fluid pressure operated means operative to connect the latter to said gear changing element for actuation thereof.

8. Shifting mechanism for an automobile transmission mechanism having a plurality of shiftable speed changing elements, comprising actuating mechanism for said elements having a plurality of electro-magnetic devices for rendering it differently operative upon said elements, and control means for said electro-magnetic devices embodying a speed-responsive device, a switch member operative by the speed responsive device, and means for rendering the speed responsive device non-operative upon said switch member and for rendering said switch member selectively operative manually.

9. Shifting mechanism for an automobile transmission mechanism having a plurality of shiftable speed changing elements, comprising actuating mechanism for said elements having a plurality of electro-magnetic devices for rendering it differently operative upon said elements, and control means for said electro-magnetic devices including a series of contacts connected to the respective electro-magnetic devices and a cooperating contact, and speed-responsive means for relatively moving said series of contacts and cooperating contact to cause engagement of the latter with one or another of the series of contacts automatically according to speed, the series of contacts and the cooperating contact being both movable to advance or retard the engagement thereof and to selectively engage any of said series of contacts and the cooperating contact manually independently of the speed responsive means.

10. Shifting mechanism for an automobile transmission mechanism having a plurality of shiftable speed changing elements, comprising actuating mechanism for said elements having a plurality of electro-magnetic devices for rendering it differently operative upon said elements, and control means for said electro-magnetic devices including a series of contacts connected to the respective electro-magnetic devices and a cooperating contact, and speed-responsive means for relatively moving said series of contacts and cooperating contact to cause engagement of the latter with one or another of the series of contacts automatically according to speed, the speed responsive means being capable of being rendered ineffective with respect to said contacts and said contacts being capable of relative movement manually independently of said speed responsive means to selectively engage one or another of said series of contacts with said cooperating contact.

11. Shifting mechanism for an automobile transmission mechanism embodying a shiftable gear changing element, comprising a cylinder having pistons mounted in opposed relation therein, means for connecting one or another of the pistons to said gear changing element to actuate it, and means for supplying fluid pressure to the cylinder between said pistons to actuate one or the other thereof.

12. Shifting mechanism for an automobile transmission mechanism embodying a shiftable gear changing element, comprising a cylinder having pistons mounted in opposed relation therein, means for connecting one or another of the pistons to said gear changing element to actuate it, means for locking one of said pistons against movement when the other piston is connected to said element, and means for supplying fluid pressure to the cylinder between said pistons to actuate one or the other thereof.

13. Shifting mechanism for an automobile transmission mechanism embodying a shiftable gear changing element, comprising a cylinder having pistons mounted in opposed relation therein, springs acting equally and in opposite directions on said pistons to normally hold them in predetermined positions in the cylinder and to return them to such positions after actuation, means for connecting one or another of the pistons to said gear changing element to actuate it, and means for supplying fluid pressure to the cylinder between said pistons to actuate one or the other thereof.

14. Shifting mechanism for an automobile transmission mechanism embodying a shiftable gear changing element, comprising a cylinder having pistons mounted in opposed relation therein, means for connecting one or another of the pistons to said gear changing element to actuate it, means for supplying fluid pressure to the cylinder between said pistons to actuate one or the other thereof, and means for retarding the movement of each piston under the action of the fluid pressure.

15. Shifting mechanism for an automobile transmission mechanism having a pair of adjacently-located reciprocatory gear changing elements, comprising a cylinder having a pair of pistons mounted in opposed relation therein for independent axial reciprocation and rotation, each piston having an actuating portion thereon, a controlling member having a spline connection to each piston for rotating it in one or the other direction from a normal position to bring the actuating portion thereon into engagement with one or another of said gear changing elements to actuate it, and locking portions on the cylinder located to lock the respective pistons against axial movement while in its normal disengaged relation with said gear changing elements.

16. Shifting mechanism for an automobile transmission mechanism having a pair of reciprocatory gear changing elements, comprising a pair of cylinders each having a pair of pistons mounted in opposed relation therein for independent reciprocation, and a connecting member movable transversely of each piston into and out of connecting relation with one of said gear changing elements, the cylinder having a portion to cooperate with each connecting member while in disconnected relation with the respective gear changing element to lock the respective piston against reciprocation and to clear said connecting member and permit reciprocation of the respective piston when said connecting member is in connecting relation with the respective gear changing element, and hold said connecting member in connecting relation with said element.

17. Shifting means for an automobile transmission mechanism having a shiftable gear changing element and a clutch pedal for controlling the transmission of power, comprising fluid pressure operated means for actuating said gear changing element, and a cylinder having a piston therein provided with a lost-motion connection to the clutch pedal and operative by the clutch pedal to supply fluid pressure to said fluid pressure operated means to actuate the gear changing element after the clutch pedal has been operated to an extent sufficient to disengage the clutch controlled thereby.

18. Shifting means for an automobile transmission mechanism having a shiftable gear changing element, comprising fluid pressure operated means for actuating said element, means including a pump operated by the transmission for continuously supplying fluid under pressure to said fluid pressure operated means to actuate it, means for operatively connecting said fluid pressure operated means to said gear changing element, a valve operative to relieve the fluid pressure on said fluid pressure operated means and permit return of said fluid pressure operated means to normal position, and common control means for said connecting means and valve.

19. Shifting means for an automobile transmission mechanism having shiftable gear changing elements, comprising means for actuating said elements to effect different gear changes, means including solenoids for setting said means in actuating relation with said elements, a solenoid-operated release device for said actuating means to permit return thereof to normal inactive condition, and means for controlling said solenoids and solenoid-operated release device including a plunger, cooperative switch contacts engageable by operation of the plunger to complete the circuits of said solenoids, a switch connected in circuit with the solenoid operated release device for causing actuation of said device, and a cam actuated by said plunger for closing said switch at each operation of the plunger prior to the engaging of said switch contacts.

20. Shifting means for an automobile transmission mechanism having shiftable gear changing elements, comprising means for actuating said elements to effect different gear changes, means including solenoids for setting said actuating means in actuating relation with said elements, a device for holding said actuating means in actuated condition and having a solenoid for operating it to release said actuating means and permit return thereof to normal condition, controlling switches for the solenoids for setting the actuating means and the releasing solenoid of said holding device, and means including an operating member operative upon each actuation thereof to close the switch controlling the releasing solenoid of said holding device and to thereafter close the switch controlling the solenoids for setting said actuating means.

21. In an automobile having a steering wheel and transmission mechanism having a plurality of shiftable speed changing elements, shifting mechanism for said speed changing elements, and a speed responsive device mounted in the hub of the steering wheel and embodying means for determining the different gear changes to be made by the shifting mechanism either automatically according to speed or manually free of the influence of the speed responsive device and means for indicating the speeds for gear shifting.

22. Shifting mechanism for an automobile transmission mechanism having shiftable speed changing elements, comprising actuating mechanism differently operative upon said elements to effect different speed changes, speed responsive means for automatically controlling said actuating mechanism, and means operable free of the influence of the speed responsive means for manually selecting the speed changing operations of said actuating mechanism independently of said speed responsive means.

23. Shifting mechanism for an automobile transmission mechanism having shiftable speed changing elements, comprising actuating mechanism operative upon said elements to effect different speed changes, speed responsive means for controlling the operation of said actuating mechanism automatically according to speed, manually operative means operative independently of said speed responsive means and free of the influence thereof for selectively setting the actuating mechanism for different speed changes, and means for visually indicating the setting of the shifting mechanism for different speed changes.

24. Shifting mechanism for an automobile transmission mechanism having shiftable speed changing elements, comprising actuating mechanism differently operative upon said elements to effect different speed changes, speed responsive means for automatically controlling said actuating mechanism, means for restoring said elements to neutral positions, and means operative manually and independently of said speed responsive means to selectively determine the speed changing operations of the actuating mechanism and the restoring of said elements to neutral position entirely free of the influence of the speed responsive means.

25. Shifting mechanism for an automobile transmission mechanism having shiftable speed changing elements, comprising actuating mechanism differently operative upon said elements to effect different speed changes, a speedometer, and controlling means for said actuating mechanism having means for connecting it to said speedometer to be governed by the operation of said speedometer and for disconnecting it from the speedometer for operation independently thereof.

26. Shifting mechanism for a transmission mechanism having a shiftable speed changing element, comprising actuating mechanism for said element having electro-magnetic devices for controlling the shifting of said element, and control means for said electro-magnetic devices embodying a series of contacts connected respectively to said electro-magnetic devices, a speed responsive device, a visible contact movable by the speed responsive device to successively engage one or another of said series of contacts during its advance, said visible contact being disconnectible from the speed responsive device for manual operation, and a speed indicator operative by the speed responsive device and cooperative with said visible contact.

27. Shifting mechanism for a transmission mechanism having a shiftable speed changing element comprising actuating mechanism for said element having devices for rendering it differently operative upon said element to effect different speed changes, and control means for said devices embodying a plurality of control members connected respectively to said devices, a member cooperative with one or another of said plurality of control members, a speed responsive device for relatively moving said plurality of control members and cooperative member for automatically rendering said element operative to effect different speed changes, and means for rendering said control and cooperative members relatively movable selectively independently and free of the influence of said speed responsive device for manual selection of speed changes.

28. Shifting mechanism for a transmission mechanism having a shiftable speed changing element, comprising actuating mechanism for said element having devices for rendering it differently operative upon said element to effect different speed changes, and control means embodying a plurality of control members connected respectively to said devices, a member cooperative with one or another of said plurality of control members, a speed responsive device for relatively moving said plurality of control members and cooperative member for automatically rendering said element operative to effect different speed changes, and means for rendering said control and cooperative members relatively movable independently of said speed responsive device for selection of speed changes at will, said control and cooperative members being also relatively movable independently of said speed responsive device to advance or retard the cooperation thereof under the control of said speed responsive device.

29. Shifting mechanism for a transmission mechanism having a shiftable speed changing element, comprising actuating mechanism for said element having devices for rendering it differently operative upon said element to effect different speed changes, and control means embodying a plurality of control members connected respectively to said devices, a movable member cooperative with one or another of said plurality of control members, a speed responsive device for moving said movable element to bring it into cooperation with one or another of said control members, and a coupling device between said movable member and speed responsive device having means for moving said member manually and independently of the speed responsive device selectively into cooperation with one or another of said control members.

30. Shifting mechanism for a transmission mechanism having a shiftable speed changing element, comprising actuating mechanism for said element having devices for rendering it differently operative upon said element to effect different speed changes, and control means embodying a plurality of control members connected respectively to said devices, a movable support carrying said control members, a movable member cooperative with one or another of said plurality of control members, a speed responsive device for moving said movable member to bring it into cooperation with one or another of said control members, said movable support being adjustable to alter the position of said control members relatively to the position of said movable member as determined by the speed responsive device and thereby advance or retard the cooperation thereof with said control members, and a coupling device between said movable member and speed responsive device for permitting movement of said movable member at will independently of the speed responsive device and selectively into cooperation with one or another of said control members.

31. Shifting mechanism for a transmission mechanism having shiftable speed changing elements, comprising actuating mechanism having electro-magnetic devices for rendering it differently operative upon said elements, and control means embodying a series of electrical contacts connected respectively to said electro-magnetic devices, a speed responsive device, and an electrical contact member having means for connecting it to said speed responsive device for movement thereby into engagement with said series of contacts, said contact member being disconnectible from said speed responsive device for manual movement selectively into engagement with one or another of said series of contacts.

32. Shifting mechanism for a transmission mechanism having shiftable speed changing elements, comprising actuating mechanism for said elements having electro-magnetic devices for rendering it differently operative upon said elements to set them for three different speeds forward and for reverse, and control means embodying a series of four control contact members connected respectively to said electro-magnetic devices, speed responsive means and a cooperative contact member having means for movably connecting it to said speed responsive means for operation automatically thereby or manually independently thereof, said control and cooperative contact members being relatively movable automatically and manually to set the actuating mechanism for three speeds forward and relatively movable manually for reverse.

33. Shifting mechanism for transmission mechanism having shiftable speed changing elements, comprising electro-magnetically controlled actuating means differently operative upon said elements to effect different speed changes, electro-magnetically controlled means cooperative with said actuating mechanism to restore said elements to neutral condition, switches connected respectively to the electro-magnetically controlled speed changing and neutral restoring means, and an actuating member common to said switches and operative at the will of the operator to first close and then open the switch controlling the neutral restoring means and to then close and open the switch controlling the speed changing means.

EDWARD JOHN THURBER.